May 3, 1932.  L. DE FLOREZ  1,856,695
SHOCK ABSORBER FOR PRESSURE CONTROLLED INDICATING AND RECORDING DEVICES
Filed July 20, 1928
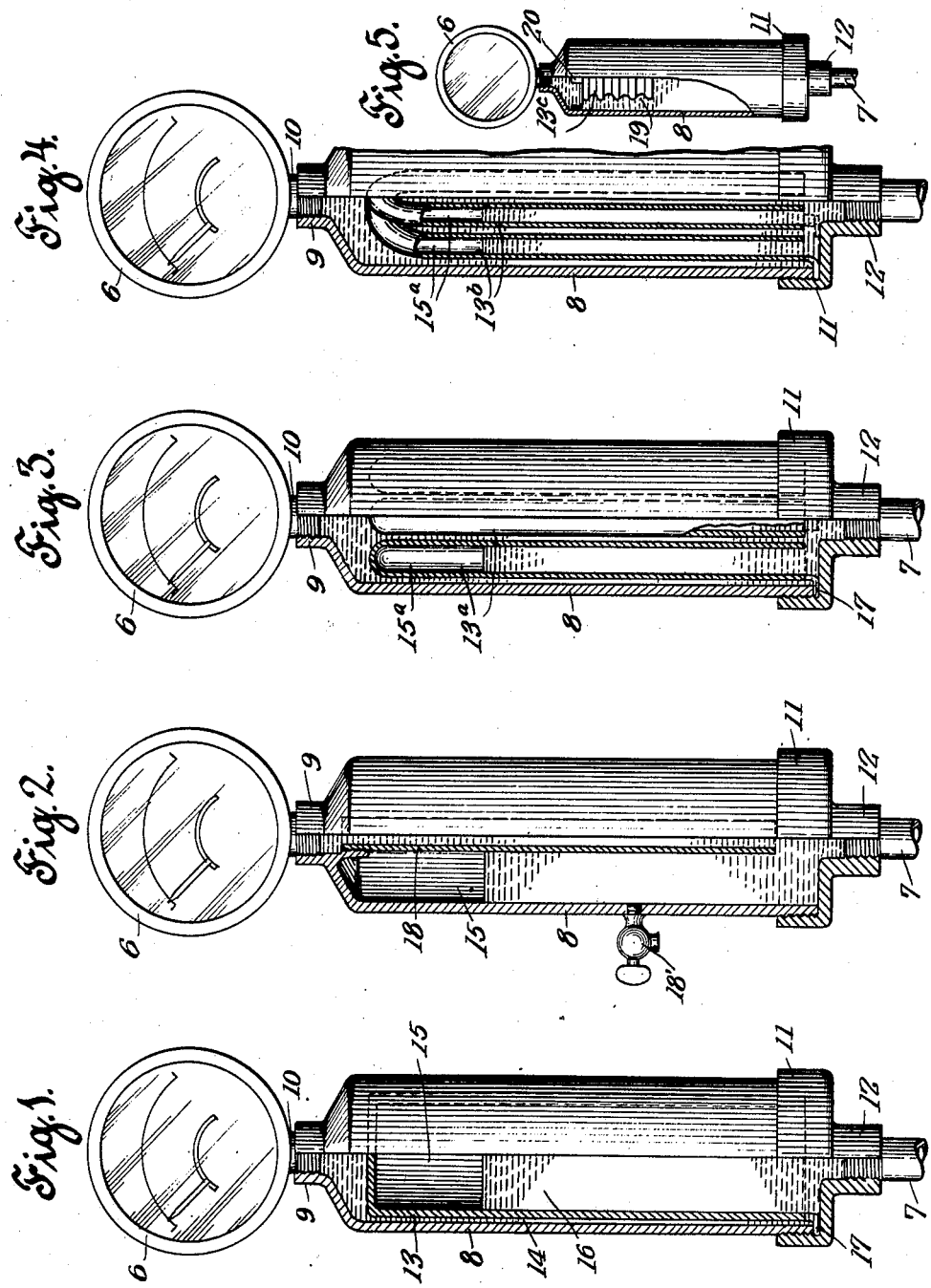
INVENTOR
Luis De Florez
BY
Philip S. McLean
ATTORNEY Patented May 3, 1932

1,856,695

UNITED STATES PATENT OFFICE

LUIS DE FLOREZ, OF POMFRET, CONNECTICUT

SHOCK ABSORBER FOR PRESSURE CONTROLLED INDICATING AND RECORDING DEVICES

Application filed July 20, 1928. Serial No. 294,095.

This invention relates to methods and apparatus for improving the operation of pressure responsive devices, such as pressure gages and the like, where such devices are operated in connection with liquid pressure. It is known that fluctuation in a liquid supply system such as may be caused by pump pulsations and surges in the line often render the gage or other instrument inoperative or unreliable. These sensitive instruments respond not only to the average pressure but also to the superimposed sudden variable surges and the motion imparted to them at times by such surges and pulsations is violent and defeats their usefulness.

The objects of the invention are to provide simple and practical means for overcoming these effects and to enable a device such as the pressure gage to give a steady accurate reading free from pulsations.

These and other desirable objects are attained by certain novel features of construction, combination and relations of parts as hereinafter set forth.

The drawings accompanying and forming part of this specification illustrate various practical embodiments of the invention, but it should be understood that the structure is susceptible of further modification without departure from the true spirit and broad scope of the invention as described and claimed.

Fig. 1 is a side elevation partly in vertical section showing one simple form of the invention; Figs. 2, 3, 4 and 5 are similar views illustrating modifications of the same basic idea.

The gage illustrated at 6 may be of any usual or special construction for indicating, for instance, pressure in an oil line 7, but this instrument may be of any form of pressure responsive device useful for the purpose of registering, recording or controlling pressure.

Interposed in the line and preferably immediately adjoining the gage is a trap construction for holding a cushion or cushions of air or gas for acting on the liquid and operating as a compensator to absorb the surges and pulsations set up by the pump.

This trap is shown in Fig. 1 as a tubular column 8 having a reduced neck 9 at the upper end receiving the screw neck 10 of the gage and closed at the lower end by a screw cap 11 coupled in the line by a reduced neck extension 12, this column containing an inverted closed end tube or bell 13, which is fully open at the bottom so as to receive the liquid from the line and has a small clearance at 14 about the sides of the same to pass the liquid up to the gage. A cushion of air or gas is thus trapped at 15 in the head of the bell. This cushion is in direct line with the column of liquid 16 from the supply pipe and so directly subjected to the hammer or pulsing of the liquid and hence most effective to absorb such pulsations. The increase in cross-sectional size of the bell over the pipe line provides a relatively large cushion and a wide area for the liquid column to operate on so the effect of the pulsations is substantially absorbed and the pressure transmitted to the gage is therefore substantially constant. The small clearance about the sides of the bell is a further factor in keeping the gage reading constant or free from fluctuations, as there is sufficient friction between the sides of the bell and the enclosing walls of the standard or column to retard and hold back surges in the liquid sufficiently to allow the gas cushion to take effect. If desired, the bell may fit so closely as to provide only a capillary passage about the same. The bell may be suitably anchored as by means of one or more lugs such as indicated at 17 caught between the lower end of the standard and base cap 11. It will be noted that if a leak develops around the thread of the pressure device, which often happens, no gas will be lost and thus the cushion is retained. This thus differs from the usual "pig tail" or air chamber heretofore sometimes used.

The structure shown in Fig. 2 differs from the first disclosure in that a small pipe 18, which may be a capillary tube, is threaded up into the neck of the hollow standard, which pipe is open at the lower end to provide a reduced liquid passage to the gage, the upper portion of the standard surrounding this pipe then serving as a bell to hold the entrapped air cushion 15. This air or gas cushion, like the first, is of considerable area and the liquid passage to the gage is more or less restricted, so that the line pulsations and surges are absorbed to the extent that the gage reading is substantially steady.

The structure shown in Fig. 3 differs from the first form in that the bell is made up of a plurality of closed end tubes 13a rather closely nested in the hollow standard so as to provide restricted liquid passages about the same.

Fig. 4 illustrates a construction generally similar to the last, the main distinction being that the tubes 13b are doubled upon themselves to provide the air cushions 15a in the loops at the upper ends of the same.

The entrapment of the air or gas is effected automatically by simply letting the liquid into the line after the device is connected up for service. If desired, provision may be made for either restoring or reducing the volume of the air cushion, as by way of a plug or valve in communication with the liquid seal of the bell chamber, such as the petcock shown at 18' in Fig. 2. The gas cushion is sealed off here as in the first form.

If desired, the air cushion may be completely and permanently sealed as illustrated at 13c in Fig. 5, where it is defined by and contained within a sealed "sylphon" 19 mounted within the hollow standard and held in position to be subjected to the incoming pulses as by bracket arms 20 at the upper head of the sylphon engaged with the surrounding walls of the column. In this, as in the preceding instances, the air cushion is subjected to the line pressure so as to absorb the pulsations and the liquid communication to the gage is restricted, in this case, by the passages about the sides and around the upper head of the sylphon.

A feature of the invention deserving special attention is that the shock absorbing cushion is entirely sealed as regards the gage and therefore will not be dissipated by leaks. This means furthermore, that if any leakage develops about the connection between the gage and its hollow support, such leakage will be oil or liquid, rather than air. This leakage of liquid will be detected, whereas a leakage of air would be much less likely noted, and such leakage will not have any effect on the steady reading of the gage. The invention is comparatively simple and inexpensive, and provides a substantial support for the gage, eliminating vibration tendencies at the gage.

What is claimed is:

A device for eliminating the fluctuation of pressure gages in oil lines subjected to surges caused by pumps and the like, said device comprising a tubular column of considerably greater cross-sectional dimensions than an oil line with which the device is adapted to be used and provided at the top with a reduced neck for mounting a gage in communication with the interior of the column and at the bottom with a reduced neck for connection with the pipe line, whereby the fluid from the oil line or the like is directly entered into the bottom of the enlarged chamber formed by the column, and an air cushioning chamber removably secured in fixed relation within the column, said air cushioning chamber being closed at the top but open at the bottom and positioned with the open lower end of the same over the lower pipe connection, so as to directly receive the liquid from the oil line and said air chamber occupying the portions of greater cross-sectional dimensions of the column to form an expansion chamber for the liquid and giving to the latter a wide cross-sectional area for operating on a cushion of air trapped in the upper closed end of the air chamber and said air chamber so nearly completely filling the interior of the column as to provide restricted liquid passages about the same to the gage connecting outlet in the top of the column, whereby the surges of the liquid are absorbed over a wide area by a cushion of air directly exposed to an expanded body of the liquid and communication of fluctuation to a gage or the like instrument is further controlled by close restriction of the liquid between the cushioned body of liquid and the connection for the gage at the top of the column.

In testimony whereof I affix my signature.

LUIS DE FLOREZ.